(12) United States Patent
Huang et al.

(10) Patent No.: US 8,139,934 B2
(45) Date of Patent: Mar. 20, 2012

(54) CLOSE-UP PHOTOGRAPH DEVICE

(75) Inventors: Kuo-Cheng Huang, Hsinchu (TW);
Feng-Chang Hsu, Pingtung (TW);
Chien-Shing Lee, Kaohsiung (TW);
Tai-Shan Liao, Taichung (TW);
Fong-Zhi Chen, Hsinchu (TW);
Jung-Ru Yu, Kaohsiung (TW)

(73) Assignee: Instrument Technology Research Center, Hsinchu (TW)

( * ) Notice: Subject to any disclaimer, the term of this patent is extended or adjusted under 35 U.S.C. 154(b) by 752 days.

(21) Appl. No.: 11/507,835

(22) Filed: Aug. 22, 2006

(65) Prior Publication Data

US 2007/0047947 A1    Mar. 1, 2007

(30) Foreign Application Priority Data

Aug. 23, 2005   (TW) ................................ 94214461 U

(51) Int. Cl.
*G03B 15/06* (2006.01)
(52) U.S. Cl. ........................................................ 396/199
(58) Field of Classification Search ................. 396/182,
396/199, 155, 190, 198; 348/68
See application file for complete search history.

(56) References Cited

U.S. PATENT DOCUMENTS

| | | | |
|---|---|---|---|
| 4,519,684 A * | 5/1985 | Francis et al. ................ 396/113 |
| 5,294,948 A * | 3/1994 | Merkt et al. .................. 396/544 |
| 5,781,807 A * | 7/1998 | Glassgold et al. ............. 396/71 |
| 6,404,984 B1 * | 6/2002 | Parvulescu et al. ........... 396/16 |
| 6,430,371 B1 * | 8/2002 | Cho ............... 396/176 |
| 6,982,740 B2 * | 1/2006 | Adair et al. .................... 348/76 |
| 7,127,163 B2 * | 10/2006 | Lee et al. ...................... 396/198 |
| 7,136,582 B2 * | 11/2006 | Hayami et al. ................ 396/182 |
| 7,340,159 B2 * | 3/2008 | Sugiura et al. ................. 396/14 |
| 7,352,387 B2 * | 4/2008 | Yamamoto ..................... 348/63 |
| 7,415,202 B2 * | 8/2008 | Fujimoto et al. .............. 396/164 |
| 7,422,353 B2 * | 9/2008 | Tenmyo ....................... 362/551 |
| 7,480,455 B2 * | 1/2009 | Lin ............................... 396/182 |
| 7,486,885 B2 * | 2/2009 | Tenmyo ....................... 396/198 |
| 2004/0021834 A1 * | 2/2004 | Satomi ........................... 353/65 |
| 2005/0237635 A1 * | 10/2005 | Sugita et al. .................. 359/818 |
| 2006/0078330 A1 * | 4/2006 | Noto et al. .................... 396/452 |
| 2006/0215406 A1 * | 9/2006 | Thrailkill ...................... 362/252 |

* cited by examiner

*Primary Examiner* — Rodney Fuller
(74) *Attorney, Agent, or Firm* — Volpe and Koenig, P.C.

(57) ABSTRACT

A photograph device is provided. The photograph device includes a body, a lens device mounted on the body, and an illuminating device mounted on the body and surrounding the lens device.

9 Claims, 6 Drawing Sheets

CLOSE-UP PHOTOGRAPH DEVICE

FIELD OF THE INVENTION

This invention relates to a close-up photograph device. In particular, it refers to a close-up photograph device that is applied to photograph equipment.

BACKGROUND OF THE INVENTION

Amongst the many types of equipment for photography, the most widely used is the camera. For majority of the general publics, a camera is usually regarded as a recording device during journeys to capture traveling photos such as scenery and their portraits at the site.

As the relevant electronic technology has taken off rapidly and the purchase power has on average increased recently, not only has the camera itself changed its way of recording light from use of chemicals to digital elements, its own functions have also advanced continually in both quantity and quality. Close-up photography that was once classified as a professional skill has become popularized. At present there are numerous consumable cameras, especially digital cameras, capable of close-up photography.

Nevertheless, when performing close-up photography, the camera lens is in close proximity to the object. This leads to a situation in which the surrounding light projecting towards the object becomes blocked by the approaching camera and lens. As a result, the reflected light from the object is inadequate. In order to overcome the problem of inadequate light, the following solutions have been wildly applied.

Firstly, in order to achieve a sufficient exposure value, the shutter opening time is lengthened. This solution is the so-called slow-motion camera shutter, which allows enough light to project to the light recording device, such as the charge-coupled device (CCD), the complementary metal-oxide semiconductor (CMOS) and the negative films. However, the adverse effect of lengthening shutter opening time is an increase in the possibility of camera shock, wasting both the negative films and power.

The second solution is to increase the aperture of the diaphragm. The advantage associated is that it allows more light passing through the lens to reach the light recording device without changing the shutter speed. However, the problem incurred with a greater aperture of the diaphragm is the poorer resolution and contrast of lens. Furthermore, the most serious problem is that the depth of field (DOF) is very narrow when performing close-up photography with a wide-open diaphragm. If using thickness as an analogy, the DOF is often as thin as a piece of paper, i.e. only within the thickness of a paper is the image of the object clear. Anything outside this DOF is blurred. This is obviously an annoyance to users. For example, when wishing to photograph a flower that is a 3D object, the distance from the flower bud, pedal to stem is usually a few tens of millimeters, which is always beyond the coverage of lens with wide-open diaphragm.

Therefore, from the principle of exposure, in order to capture the same exposure value, the shutter is adjusted to a faster speed when the diaphragm is opened wider, or the speed of shutter is lowered when the aperture of the diaphragm is smaller. This demonstrates that the aperture of the diaphragm must be small when attempting to accommodate sufficient DOF. However, this leads to a slower shutter and causes the problem of camera shock. One solution for this situation is to use a tripod to support the camera. However, as tripod is of substantial weight, it is not a perfect portable device, especially whilst traveling. Another solution is to use the film with a higher ISO or to increase the sensitivity of electronic light sensitive device to a higher setting. This will elevate the shutter speed. However, the high ISO films have greater particles and lower resolutions, which are evident after enlargement. The dpi of a high ISO film is also smaller than the lower ISO film. For digital cameras, increasing sensitivity of light sensitive device adversely results in enhancement of noise, the elimination of which depends hugely upon the software and firmware performance of the camera itself, or by the graphics editing software. If these elements or softwares are ineffective, the picture quality will be poor. Therefore, this is not an ideal solution either.

Certainly, another solution is to increase the amount of light projected on the object. Flash light is usually employed to illuminate the object to allow greater reflection of light for the light-sensitive element to detect. However, it is mostly in or above the camera body regardless of whether it is internal or external. Although it is appropriate for ordinary use, in the case of close-up photography, the problem of lens blocking the light remains.

In light of this necessity of providing the object with sufficient light, the conventional approach is to place a close-up flash in front of the lens. However, it is usually designed for professional purpose. An ordinary consumer is generally not able to manage the volume, weight or price. In addition, although most cameras are capable of close-up photography function, it is somewhat limited. If a larger image of the object is required, an additional close-up photography lens has to be installed. The installed close-up photography lens will make it even more difficult to install a close-up flash.

Furthermore, not all digital cameras have the close-up photography function. Although it is possible to install an extra close-up photography lens on digital cameras in the market, the problem of insufficient light on the object will be encountered when it comes to performing the close-up photography. There is also difficulty in arranging the close-up photography flash and lens.

Lastly, the flash light only works when shooting. Unless the user has ample experiences, it is hard to imagine the photo taken. Therefore, it is an important task to solve the drawbacks of the close-up photography associated with digital cameras.

SUMMARY OF THE INVENTION

In accordance with an aspect of the present invention, a photograph device is provided. The photograph device includes a body, a lens device mounted on the body, and an illuminating device mounted on the body and surrounding the lens device.

Preferably, the photograph device is a close-up photograph device.

Preferably, the photograph device further includes a connector for being electrically connected the photograph device to a photograph equipment.

Preferably, the lens device is a zoom lens device.

Preferably, the zoom lens device is a manual zoom lens device.

Preferably, the body has a controller controlling an illumination of the illuminating device.

Preferably, the body has a controller controlling the lens device.

Preferably, the body has a power device providing a power to the illuminating device.

Preferably, the power device is electrically connected to a controller and controlled thereby.

Preferably, the illuminating device is electrically connected to a photograph equipment and is controlled thereby.

In accordance with another aspect of the present invention, an optical device is provided. The optical device includes a handle device, a lens device mounted on the handle device, and an illuminating device mounted nearby the lens device.

Preferably, the lens device is a magnifying glass set.

Preferably, the magnifying glass set has a center and the illuminating device has a plurality of light-emitting diodes surrounding the magnifying glass set and illuminating toward the center.

Preferably, the optical device further includes a power device.

Preferably, the optical device further includes a control device electrically connected to the power device and controlling an illumination of the illuminating device.

Preferably, the optical device further has a connecting ring mounted around the lens device for connecting the optical device with a photograph equipment.

In accordance with further aspect of the present invention, an optical assembly is provided. The optical assembly has a lens device and an illuminating device surrounding the lens device and providing an illumination to the lens device.

Preferably, the optical assembly is a close-up optical assembly, and the lens device includes a close-up lens.

Preferably, the optical device further has a controller electrically connected to the illuminating device, and the controller is electrically connected to a photograph equipment and controls the illumination of the illuminating device.

Preferably, the optical assembly further includes a connector to be connected to a front side of a lens of a photograph equipment.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
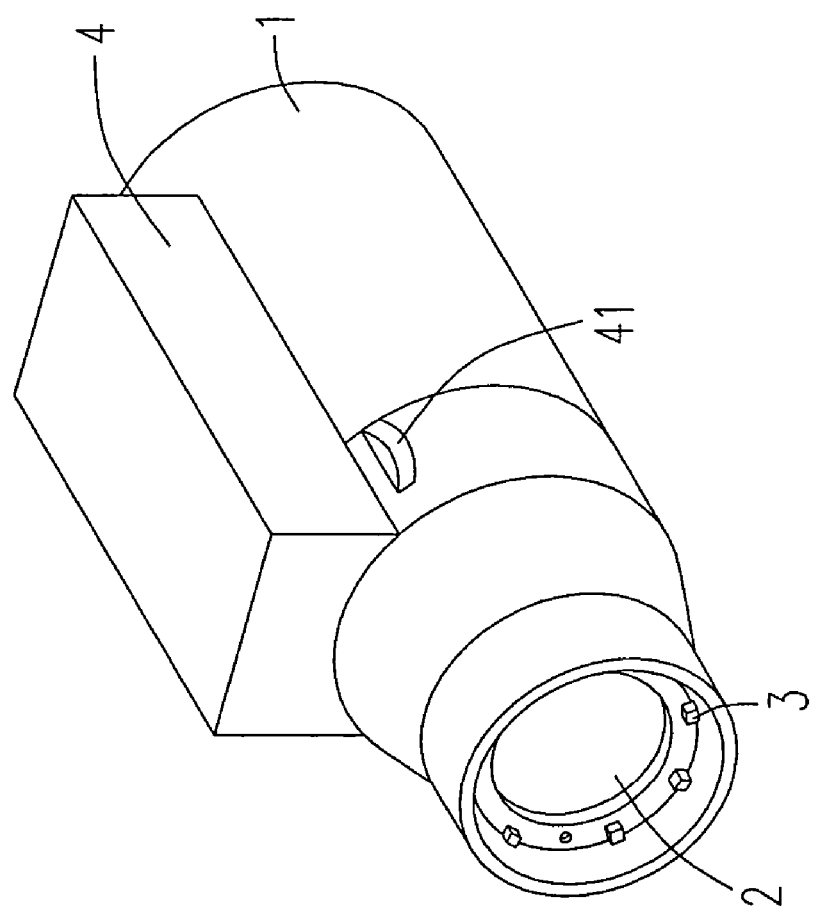
FIG. 1 is a 3D schematic view of a close-up photograph device according to the preferred embodiment of the present invention.

Please refer to FIG. 1, which is a 3D schematic view of an illuminated close-up photograph device according to a preferred embodiment of the present invention. As shown in FIG. 1, the close-up photograph device includes a core body 1, a close-up lens 2 and an illuminating device 3. Core body 1 is generally a tube-shaped object. Adopting this shape would compact the core body 1 and economize materials. During assembly, a close-up lens 2 is installed at one end of core body 1 whilst one or two or more of illuminating device 3 are placed near close-up lens 2. More specifically, the illuminating device 3 is installed on the outer rim around the close-up lens 2, in order to allow an even illumination of the entire object (not shown). With this arrangement the image of the object becomes magnified by the effect of close-up lens 2, whilst the illuminating device 3 projects light towards the object to ensure an adequate illumination. Therefore, both problems of DOF being too narrow resulted from opening diaphragm to maintain high shutter speed, or camera shock caused by lowered shutter speed to acquire deeper DOF when correcting for under exposure, are prevented. Furthermore, it is not necessary to use high ISO films or high sensitivity settings, and hence there would be no occurrence of associated relatively lower pixels or noise.

Figure 2:
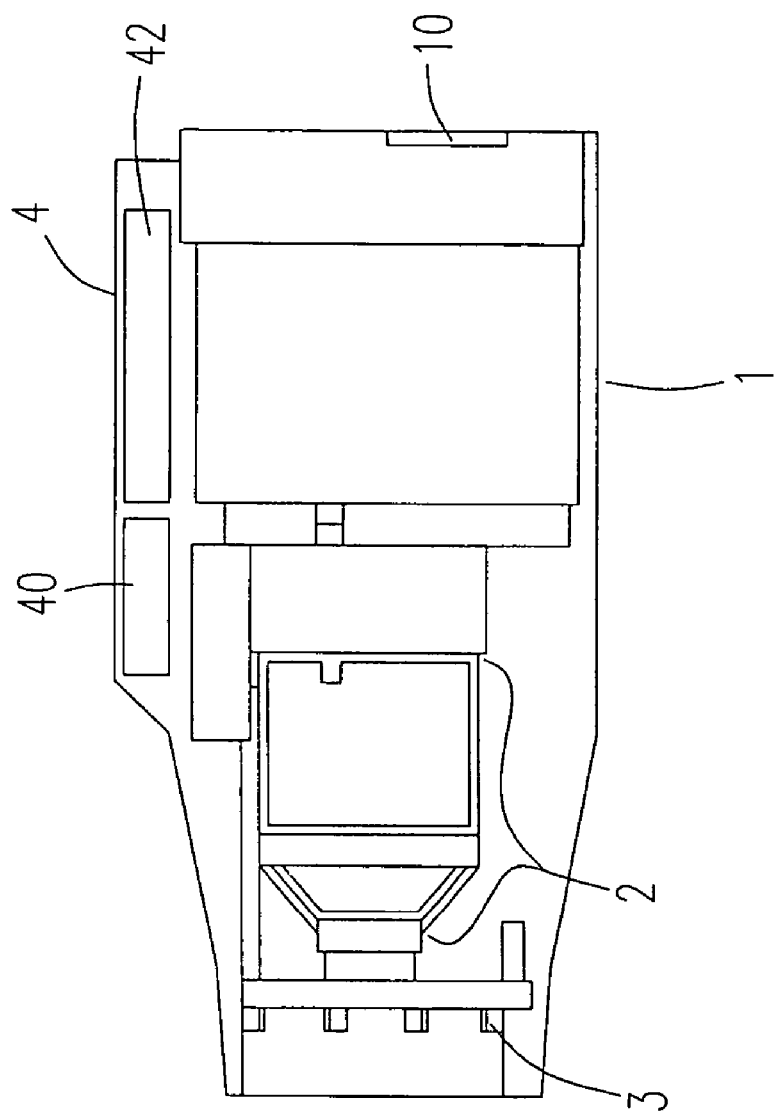
FIG. 2 is a sectional drawing of the close-up photograph device according to the preferred embodiment of the present invention.

Please continue referring to FIG. 1. As shown in FIG. 1, the close-up photograph device also includes one container 4 installed on top of core body 1, and a control button 41 is installed on container 4 or core body 1 and provides an alternative control for the illumination intensity of illuminating device 3. FIG. 2 shows the interior of container 4 with controller 40 and battery 42, which are electrically connected to one another. Controller 40 is also electrically connected to illuminating device 3, controlling its forms of illumination. This design would enable the intensity of light from illuminating device 3 to be controllable through controller 40. More specifically, the controller 40 facilitates the adjustment of brightness by controlling the number or locations of the many illuminating devices 3 required to be turned on. Battery 42 is the power supply for controller 40 and illuminating device 3.

Please refer to FIG. 2, which is the sectional drawing of an illuminated close-up photograph device according to the preferred embodiment. FIG. 2 clearly shows that core body 1 is a hollow object. At one end, there is the close-up photography lens 2, in front of which is an illuminating device 3 that provides adequate and full illumination on the whole object (not shown) when performing close-up photography. Container 4 is on top of core body 1, containing a battery 42 and a controller 40. Battery 42 provides power that supports controller 40 and illuminating device 3. A connecting ring 10 is in place at the other end of core body 1, away from illuminating device 3, providing a link for core body 1 and a camera 5 (as shown in FIG. 3).

Figure 3:
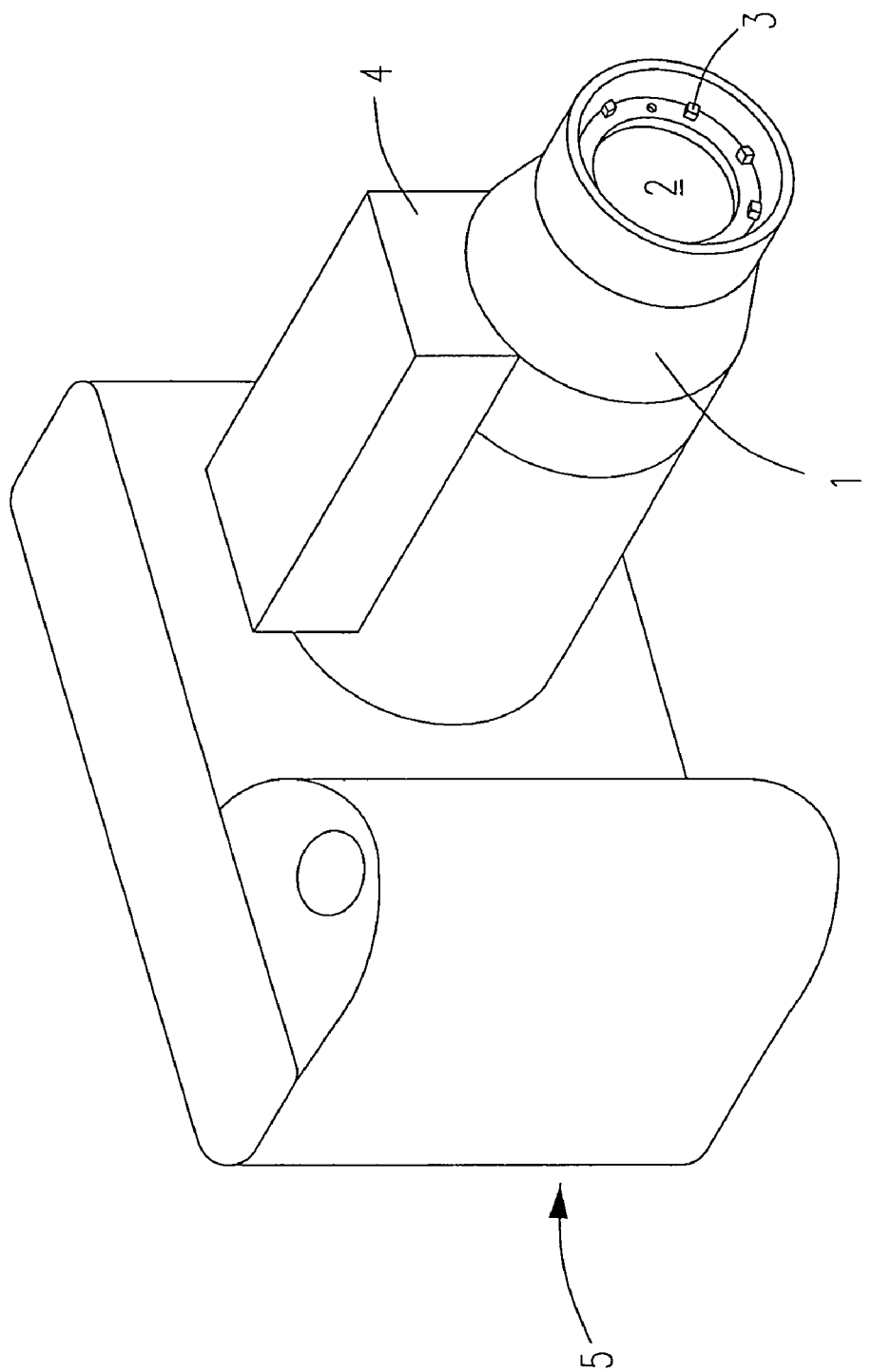
FIG. 3 is a 3D schematic view of connecting the preferred embodiment of the present invention to a photograph equipment.

Please refer to FIG. 3, which is a 3D schematic view of a preferred embodiment of the present invention connected with photograph equipment. As shown in FIG. 3, the core body 1 completely covers the lens (not shown) of camera 5, and there are multiple illuminating devices 3 in the front of core body 1. A space is vacated in the center to allow light to pass through to close-up lens 2. Container 4 is as previously described.

Figure 4:
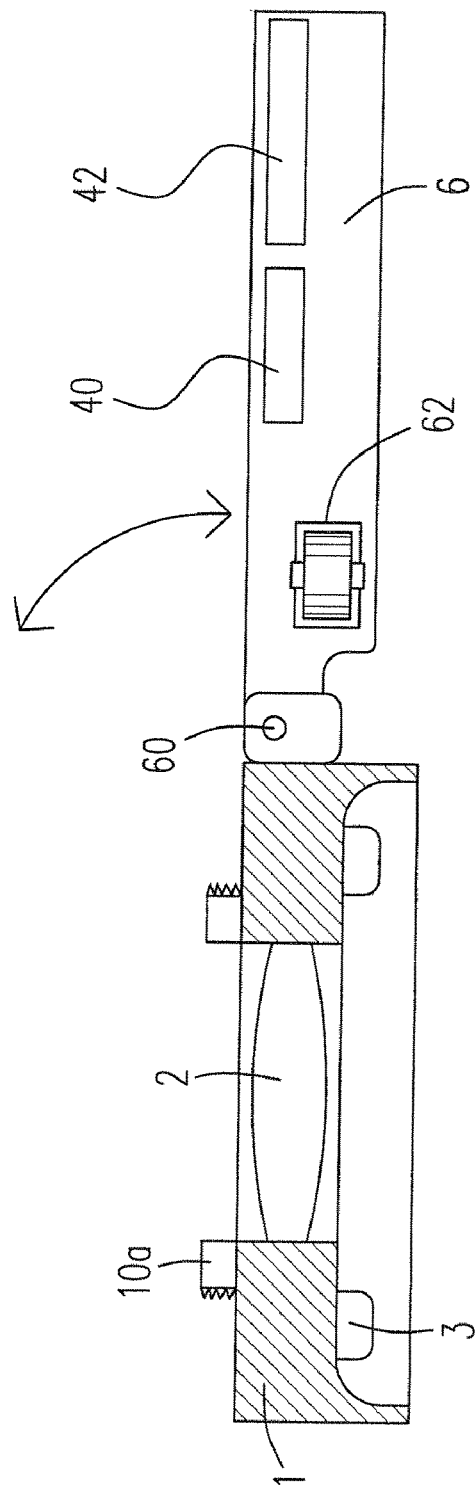
FIG. 4 is a partial sectional drawing of a close-up photograph device according to another preferred embodiment of the present invention.

Please refer to FIG. 4, which is a partial sectional drawing of another embodiment of illuminated close-up photograph device. Both close-up lens 2 and illuminating device 3 are convenient device and are of potential use on their own when not coupled to a camera, for example, as a magnifying glass with illuminating function. Since the illuminating device 3 is on the outer rim of close-up lens 2, it would illuminate an object when users observe and point the close-up lens 2 towards the object. Thus, the problem of shadow formed on the object creating a dead space for observation is prevented. In the preferred embodiment of the present invention shown in FIG. 4, the core body 1 also contains the close-up lens 2 and the illuminating device 3. On top of core body 1 there is a threaded holder 10a that is connectable with the filter holder (not shown) of camera lens (not shown), providing a link through which the camera and the close-up photograph device are integrated. An additional handle 6 is pivotally connected to the core body 1, providing an extension for holding this embodiment whilst singly used. In the situation when the present embodiment is coupled to a camera (not shown), the handle 6 would be rotated to a different angle through the pivot 60 to open a space for the coupled camera (not shown). It is possible to incorporate a battery 42 or a controller 40 in handle 6. Further installation of control button 62 on the top of handle 6 would provide a control for the illustration of illuminating device 3 or its action.

Figure 5:
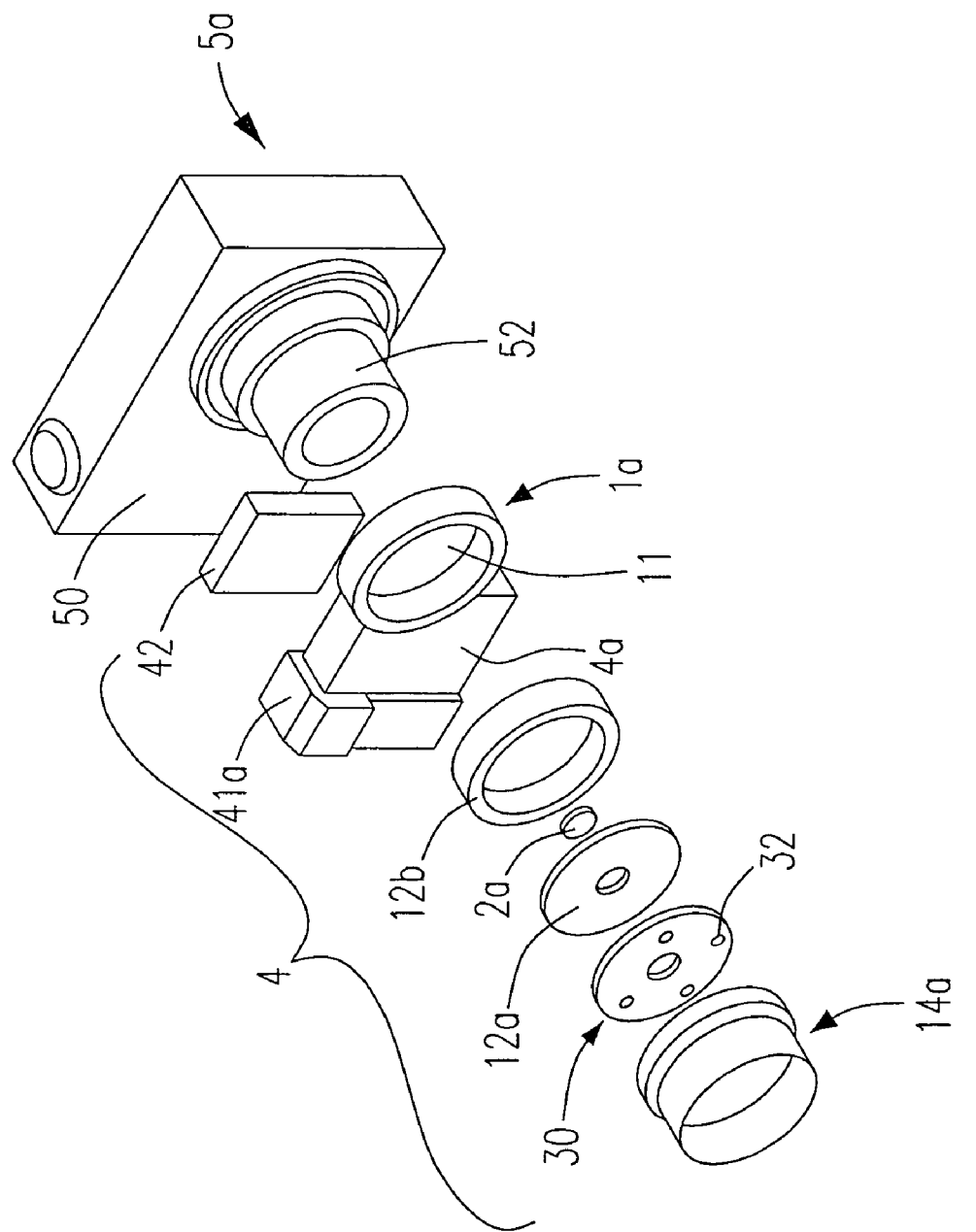
FIG. 5 is a decomposition diagram of a close-up photograph device according to another embodiment of the present invention.

Please refer to FIG. 5, which is a preferred embodiment of 3D diagram of illuminating close-up photograph device in explosion. In FIG. 5, a camera 5a is in connection with the illuminating close-up device of the present invention. This camera 5a is unique for being thin, so there is no obvious protruding object on its exterior, where a holding surface 50 is found in the front. A right-handed user could hold the camera 5a by resting the right hand middle finger and ring finger on the holding surface 50. Therefore, there is usually no camera controlling buttons on this holding face 50. Taking advantage of this feature, a container 4a designed for an embodiment of the present invention extends from the 5a core body 1a and covers holding face 50. As container 4a is placed in front of holding face 50, the operation of the camera (5a) is not affected. Controlling panel 41a is placed on top of container 4a to control the various functions of the photograph device 4. During the process of connecting the photograph device 4 to the camera 5a, the camera lens 52 goes through opening 11 bringing the close-up lens 2a directly to its front. To be able to adjust the distance between these two lenses (52 and 2a), the close-up lens 2a is fixed on a supporting stand 12a, which is placed on adjustment rim 12b. It is to be noted that these three elements (2a, 12a and 12b) are replaceable with zoom lens set. The illuminating device 30, the main feature of this invention, is placed in front of supporting stand 12a. Multiple light sources 32, mainly the light emitting diodes (LEDs), are placed on illuminating device 30. It is to be reminded that the close-up lens 2a and the illuminating device 30 form the most important part of the present invention as shown in FIG. 5 are. Container 4a is incorporated in this embodiment to provide a space for holding battery 42 when self-generating power, or for controlling circuitry (not shown). In another word, the container 4a serves the purpose for augmenting the present invention. In addition, a tube-shaped object 14a could be installed in front of illuminating device 30 to protect light source 32 and prevent an outward diffusion of light.

Figure 6:
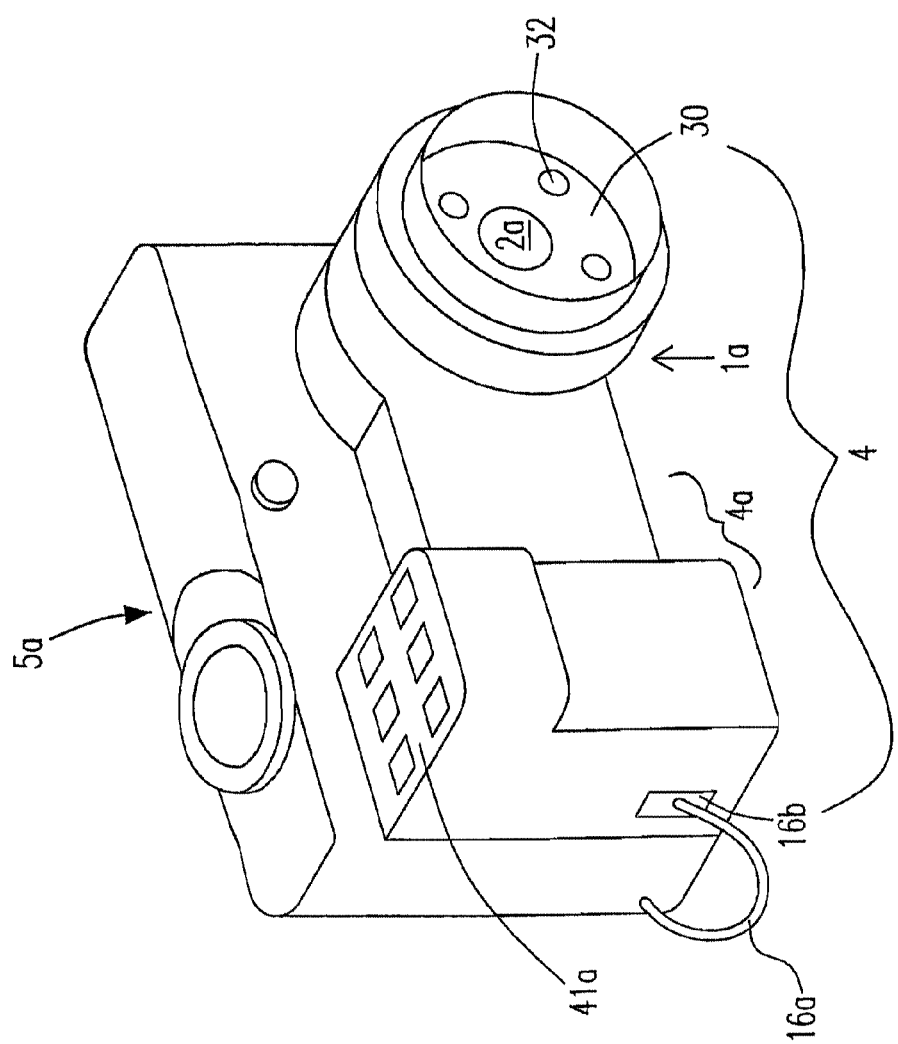
FIG. 6 is a schematic view of the embodiment shown in FIG. 5 during operation.

Please refer to FIG. 6, which illustrates the embodiment in FIG. 5 of the present invention during operation. As shown in FIG. 6, the illuminating close-up photograph device 4 is placed in front of camera 5a with container 4a covering the holding surface 50 (please refer to FIG. 5) and the controlling panel 41a above container 4a. Another unique feature of this invention is its capability of being electrically connected with camera 5a. Therefore, using a connection line 16a through the connection hole 16b in core body 1a would provide an electric connection between this photograph device 4, camera 5a and its corresponding devices (not shown). As a result, the camera 5a would be capable of controlling the illuminating device 30 and close-up lens 2a according to its own photograph functions. Of course, a standardized design of the present invention could incorporate elements such as a contact and a plug on the core body 1a that are complementary to the port and socket (not shown) of camera 5a. This circumvents the need of connection line 16a, allowing a more simplified integration of this invention and camera.

In view of the aforesaid discussion, the present invention is integrable with camera, especially digital cameras. As conventional digital cameras have many built-in photograph modes, an illuminating close-up photograph device would be even more convenient and adaptable if it is directly controlled by the camera when performing close-up mode photograph. The present invention is capable of being electrically connected with a camera. A USB port on the camera is able to provide a contact for electrical connection between the two types of equipment. Such electric connection enables the camera's own program to control the present invention or provide it with power. During close-up photography mode, the brightness, and the number and location of illuminating device 3 actuated are adjustable according to the exposure value the camera itself requires. Hence, the desirable effect is achieved under the normal photograph condition. In addition, since the illuminating device 3 is capable of employing LED, the effect of continuous illumination is generated under a low power wasting condition. Therefore, even if users are non-professionals, they are made aware of the illumination condition of this invention from the camera finder or display monitor. If the automatically generated illumination is not to users' desired standard, they would be able to adjust the settings via the illuminating element 3 or controller 40 to attain the most desired illuminating effect.

Furthermore, the close-up lens 2 in this invention is interchangeable with a zoom lens, which is a set of lens whose focal distance is adjustable. As a result, users would be able to change the focal distance of this device according to the required fold of magnification. The zooming method is either manual or automatic. If the latter is selected, the camera would be able to control zooming directly.

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A photograph device for a photograph equipment having an equipment body and a lens with a lens barrel, wherein there is a junction between the lens barrel and the photograph equipment body, comprising:

a body configured on the junction, entirely covering the lens barrel, and including a through opening, a connection hole and a container, wherein the container has a space built in the body and holds a power device therein;

an electric line passing through the connection hole and connecting the photograph device and the photograph equipment;

a lens device mounted on the body;

a plurality of light-emitting diodes mounted on the body and surrounding the lens device; and a controller adjusting an illumination of the plurality of light-emitting diodes, wherein the photograph device is a close-up photograph lens device.

2. A photograph device as claimed in claim 1, further comprising a connector that electrically connects the close-up photograph lens device to the photograph equipment.

3. A photograph device as claimed in claim 1, wherein the lens device is a zoom lens device.

4. A photograph device as claimed in claim 3, wherein the zoom lens device is a manual zoom lens device.

5. A photograph device as claimed in claim 1, wherein the power device provides a power to the plurality of light-emitting diodes.

6. A photograph device as claimed in claim 5, wherein the power device is electrically connected to the controller and controlled thereby.

7. A photograph device as claimed in claim 1, wherein the plurality of light-emitting diodes are electrically connected to the photograph equipment and controlled thereby.

8. A photograph device as claimed in claim 1, wherein the plurality of light-emitting diodes have an opaque tube-shaped cover preventing the plurality of light-emitting diodes from an outward diffusion of light.

9. A photograph device as claimed in claim 1, wherein the photo equipment further has a holding surface covered by the container, the electric line receives a controlling signal from the photograph equipment, and the power device is a battery.

* * * * *